United States Patent [19]

Wang et al.

[11] 4,448,936
[45] May 15, 1984

[54] POLYURETHANE RESIN COMPOSITION

[76] Inventors: Huei-Hsiung Wang; Chyuan-chyuan Wang, both of No. 6, Alley 69, La. 492, Sec. 1, Hsi Tun Rd., Taichung, Taiwan

[21] Appl. No.: 366,689

[22] Filed: Apr. 8, 1982

[51] Int. Cl.$^3$ .................... C08L 75/04; C08L 77/02
[52] U.S. Cl. ................................ 525/424; 525/440
[58] Field of Search .......................... 525/424, 440

[56] References Cited

U.S. PATENT DOCUMENTS

| 3,249,563 | 5/1966 | Balk | 525/424 |
|---|---|---|---|
| 3,382,305 | 5/1968 | Breen | 525/425 |
| 3,884,989 | 5/1975 | Blomberg | 525/424 |
| 3,886,229 | 5/1975 | Hutchinson | 525/28 |
| 3,968,182 | 7/1976 | Innove | 525/58 |
| 4,279,801 | 7/1981 | Kramer | 525/440 |

FOREIGN PATENT DOCUMENTS

| 132546 | 5/1949 | Australia | 525/440 |
|---|---|---|---|
| 1213987 | 4/1966 | Fed. Rep. of Germany | 525/440 |
| 2350852 | 4/1975 | Fed. Rep. of Germany | 525/424 |
| 7241759 | 6/1974 | France | 525/440 |
| 56-18669 | 2/1981 | Japan | 525/424 |

Primary Examiner—Allan Lieberman
Attorney, Agent, or Firm—Cushman, Darby & Cushman

[57] ABSTRACT

A polyurethane resin composition having better heat resistance comprises one polyurethane resin; and polyethylene terephthalate resin and/or a polyamide resin, such as nylon 6 resin or nylon 66 resin, in an amount of 8 to 30 parts by weight per 100 parts by weight of the polyurethane resin. The polyurethane resin composition is made by mixing polyethylene terephthalate resin solution with O-chlorophenol as solvent, and/or nylon 6 or nylon 66 resin solution with formic or acetic acid as solvent, with the polyurethane resin solution; and then drying in oven to eliminate the solvent for making the skin of leather-like coated fabrics which is capable of heat transfer printing.

5 Claims, No Drawings

POLYURETHANE RESIN COMPOSITION

BACKGROUND OF THE INVENTION

The present invention relates to a polyurethane resin composition for leather-like coated fabrics, particularly to a polyurethane resin composition capable of heat transfer printing.

Up to now, the conventional leather-like coated fabrics are single colored. This is done by adding a particular pigmented color to a one-component polyurethane resin. The pigmented PU resin is coated on top of a release coated paper, then oven-dried and pressed against a fabric which is already coated with an unpigmented two-component PU resin as adhesive. The leather-like coated fabric is then oven-cured and stripped away from the release paper. If such leather-like coated fabric has any leather-like striations on its surface, they are merely accomplished by printing on an embossed release paper. The fabrics here may be woven, twilled, knitted, sweating, non-woven or the like. It is apparent this type of pigmented artificial leather is single-colored, monotonic and less fascinating in its pattern. It is thus used mainly in handbag and seldom in fashion or overcoat. Although the conventional leather-like coated fabrics can be surface-printed by using PU ink, i.e. a pigmented PU resin, the available color is limited. Aside from it, the printed surface is flat, non-attactive and lack a three-dimensional feeling. Thus this method is not adopted commercially.

SUMMARY OF THE INVENTION

In accordance with the present invention, a polyurethane resin composition capable of heat transfer printing comprises:

(A) one polyurethane (PU) resin; and (B) at least one carbonyl-group containing polymer resin selected from a group consisting of polyamide resin and polyester resin in an amount of 8 to 30 parts, preferably 10-30 parts by weight per 100 parts by weight of the polyurethane resin.

In accordance with one aspect of the present invention, the polyester resin is preferably polyethylene terphthalate resin (PET), and the polyamide resin is preferably nylon 6 or nylon 66 resin.

In accordance with another aspect of the present invention, a process for manufacturing the above polyurethane resin composition comprises the steps of: preparing a solution blend of the polyurethane resin composition by mixing a polyurethane solution and at least one carbonyl-group containing polymer solution selected from a group of polyamide resin solution and polyester resin solution; and drying said solution blend to eliminate solvents from the polyurethane resin composition.

In accordance with a further aspect of the present invention, the polyamide resin solution is made by dissolving nylon 6 or nylon 66 in a solvent, e.g. formic acid, acetic acid, m-cresol, cholorophenol, trichloroacetic acid, ethylene carbonate, sulfuric acid, o-chlorophenol, phosphoric acid, HMTP(hexamethyl phosphoric acid triamide), DMSO, Trifluoroethanol, chloral hydrate, halogenated acetic acid, hydrogen fluoride, hydrogen chloride/methanol, liquid sulfur dioxide, methanol solution of calcium choloride, methanol solution of magnesium chloride, benzyl alcohol, ethylene chlorohydrin, 1, 3-chloro-propanol, 2-butene-1, 4-ethylene glycol, diethylene glycol, N-acetylmorpholin, formamide, chloroform, or trifluoro-acetic acid.

In accordance with still further aspect of the present invention, the polyester resin solution is made by dissolving polyethylene terephthalate in a solvent, e.g. o-chlorophenol, chloraldehydrate, phenol, phenol/tetrachloroethane, phenol/2,4,6-trichlorophenol, chlorophenol, nitrobenzene, DMSO, or halogenated aliphatic carboxylic acids.

In accordance with still further aspect of the present invention, the polyurethane solution is made by dissolving polyurethane resin in a solvent, e.g. DMF, benzene or toluene.

In accordance with the yet still further aspect of the present invention, the viscosity of the blend solution is controlled in a range from 5000 to 12000 cps, preferably from 6000 to 10000 cps.

It is an object of the present invention to provide a polyurethane resin composition for leather-like coated fabric which is capable of heat transfer printing.

This object and other objects will be apparent by illustration of the following specific examples. However, it should be understood that these are merely examples for the purpose of clarifying the present invention. Therefore, it is intended that the present invention be limited by the appended claims.

DETAILED DESCRIPTION OF THE PREFERRED EMBODIMENTS

In the examples, the polyurethane resin solution, the polyester resin solution and the polyamide resin solution used for preparing a solution blend of the polyurethane resin composition are separately prepared as follows:

A. Polyurethane resin solutions: it can be classified as two types.

1. One component system

One component PU resin solution of 8-20% by weight of the polyurethane resin is prepared by adding a solvent of suitable amount consisting of 2 part by volume of methyl ethyl ketone and 1 part by volume of dimethyl formamide to 20% by weight of solid content of polyurethane resin.

2. Two component system

Two component polyurethane resin solution of 8-25% by weight of the polyurethane resin is prepared by adding a solvent consisting of 1.5 part by volume of toluene or benzene, and 1 part by volume of dimethyl formamide to 25% by weight of a PU resin, 3-9% by weight of a crosslinking agent, and 2-8% by weight of an activator.

B. polyester resin solution

A polyester resin solution of 3-30%, preferably 3-25% by weight of polyester resin is prepared by dissolving the polyester chip with crystalline density 0.8-1.6 g/cc, melting point 160° C.-285° C. and molecular weight of $10^3$–$10^5$ in o-chlorophenol.

C. polyamide resin solution

A polyamide resin solution of 3-35%, preferably 5-30%, by weight of polyamide resin is prepared by dissolving the polyamide chip, i.e. nylon 6 or nylon 66 resin, with crystalline density 0.9-2.15 g/cc, melting point 200-300° C., molecular weight $10^3$–$10^6$ in formic or acetic acid.

In the case that polyester resin solution of 3-30% by weight of polyester resin is added to the one component polyurethane resin solution to obtain a solution blend, the viscosity of the solution blend is controlled at 5,000–12,000 cps, preferably at 6,000–10,000 cps. The solution blend consists of 8–30 parts by weight of polyester resin per 100 parts by weight of polyurethane resin. The volume fraction of o-chlorophenol among all solvents is 12–36%. It is found the resultant leather-like coated fabric within the above range can be easily heat tranfer printed. But if the amount of polyester of the solution blend is lower than 8 parts by weight per 100 parts by weight of a polyurethane resin, the resultant leather-like fabric is not heat resistible and thus incapable of heat transfer printing. When the amount of o-chlorophenol is insufficient, the polyester resin in coating solution is aggregated. Under these conditions, the strength of leather-like coated fabric is poor.

In the case that polyamide resin solution of 3–35% by weight of polyamide resin is added to the one component polyurethane resin solution to obtain a solution blend, the viscosity of solution blend is controlled at 5,000–12,000 cps, preferably at 6,000–10,000 cps. The solution blend consists of 10–30 parts by weight of polyamide resin per 100 parts by weight of polyurethane resin. The volume fraction of formic acid or acetic acid among all solvents is 10–30%. It is found the resultant leather-like coated fabric within the above range can be easily heat-tranfer printed. But if the amount of polyester of the solution blend is lower than 10 parts by weight per 100 parts by weight of polyurethane resin, the resultant leather-like fabric is not heat resistible and thus incapable of heat-tranfer printing. When the amount of formic acid or acetic acid is insufficient, the polyamide resin in the coating solution is aggregated; but when too much, the polyurethane resin will be hydrolyzed by the acid. Under these conditions, the strength of leather-like coated fabric is poor.

In the case that both the polyamide resin solution of 3–35% by weight of polyamide resin, and the polyester resin solution of 3–30% by weight of polyester resin are added to the one component polyurethane resin solution to obtain a solution blend, the viscosity of the solution blend is controlled at 5,000–12,000 cps, preferably at 6,000–10,000 cps. The solution blend consists of 10–30 parts by weight of polyamide resin and polyester resin per 100 parts by weight of polyurethane resin. It is found the resultant leather-like coated fabric within the above range can be easily heat transfer printed. But if the amount of polyester resin and polyamide resin of the solution blend is lower than 10 parts by weight per 100 parts by weight of polyurethane resin, the resultant leather-like fabric is not heat resistible and thus incapable of heat transfer printing; but when there is too much, the coating solution is aggregated. Under these condition, the strength of leather-like coated fabric is poor.

As illustrated in the following examples, the control of drying conditions on resin coated release paper is also essential. The drying condition is preferably set at 70°–180° C. for 30 sec.—3 min.. When the temperature is too low or the drying time is too short, the solvent can not be completely removed from the leather-like coated fabric. Thus the resultant leather-like coated fabric is not good to be subjected to heat transfer printing. When the temperature is too high, pin holes on the skin will occur due to vigorous eveporation. The strength of the leather-like coated fabric is poor.

The leather-like coated fabric made in accordance with the present invention can be heat transfer printed with disperse dye (no pigment). The control of printing temperature and time is crucial. The printing condition is preferably controlled at 100°–210° C., for 5 sec.—1 min. under normal atmosphere. But under the pressure of 0–30 torr in vacuum, the temperature is preferably set at 100°–210° C. and printing time is 5 sec.—40 sec.. When the temperature is too high, the skin is damaged; when too low, the transfer efficiency of dye is low.

EXAMPLE 1

Take 25 cc of the polyester resin solution of 3% by weight of polyethylene terphthalate, resin to mix with 60 cc of one component PU resin solution of 10% by weight of the polyurethane resin to obtain a blend solution. The polyurethane resin composition of the resultant blend solution is 12.5 parts by weight of PET resin per 100 parts by weight of PU resin. The blend resin is coated on top of a release paper, then oven-dried at 80° C. for two minutes and pressed against a fabric which is already coated with a two-component PU resin as adhesive. The fabric is then oven-cured and separated from the release paper. This leather-like coated fabric is heat-transfer printed at 200° C. for 20 seconds with a transfer print paper (with disperse dye). The printed artificial leather is found to be colorful, to be of good physical strength and to posses a 3–4 grade of color fastness (tests of good fastness to washing and to light respectively by AATCC-19A-1977 and AATCC-61-1980), which properties are indicated in Table I.

EXAMPLE 2

The procedure of example 1 is followed except 10 cc of the polyester resin solution of 3% by weight of polyethylene terephthalate resin is added. The polyurethane resin composition of the resultant blend solution is 5 parts by weight of polyethylene terephthalate per 100 parts by weight of polyurethane resin. The resultant skin of the leather-like fabric exhibits properties as indicated in Table I.

EXAMPLE 3

The procedure of example 1 is followed except 25 cc of the polyester resin solution of 8% polyethylene terephthalate resin is added. The polyurethane resin compostion of the resultant blend solution is 33.33 parts by weight of polyethylene terephthalate resin per 100 parts by weight of polyurethane resin. The resultant skin of the leather-like fabric exhibits properties as indicated in Table I.

TABLE I

| Example No. | PET (parts by weight) | PU (parts by weight) | Physical strength | Color fastness (in grade) |
|---|---|---|---|---|
| 1 | 12.5 | 100 | good | 3–4 |
| 2 | 5 | 100 | bad* | |
| 3 | 33.33 | 100 | port** | |

Remark:
*denotes the resultant skin adheres to transfer print paper.
**denotes the resultant skin has pinholes.

EXAMPLE 4

Take 10 cc of the polyamide resin solution of 8% by weight of nylon 6 resin or nylon 66 to mix with 60 cc of one component PU resin solution of 10% by polyurethane resin to obtain a blend solution. The polyurethane resin composition of the resultant blend solution is 13.33 parts by weight of nylon 6 or nylon 66 per 100 parts by weight of polyurethane resin. The blend solution is coated on top of a release paper, then oven-dried at 80°

C. for 1 minute and pressed against a fabric which is already coated with a two-component PU resin as adhesive. The fabric is then oven-cured and separated from the release paper. This leatherlike coated fabric is heat-transfer printed at 200° C. for 20 seconds with a transfer print paper (with disperse dye). The printed leather is found to be colorful, to be of good physical strength and 3-4 grade of color fastnes which properties are listed in Table II.

EXAMPLE 5

The procedure of example 4 is followed except 10 cc of the polyamide resin solution of 5% by weight of nylon 6 resin or nylon 66 resin is added. The polyurethane resin composition of the resultant blend solution is 8.33 parts by weight of nylon 6 or nylon 66 per 100 parts by weight of polyurethane resin. The resultant skin of the leather-like fabric exhibits properties as indicated in Table II.

EXAMPLE 6

The procedure of example 4 is followed except 10 cc of the polyamide resin solution of 20% by weight of nylon 6 of nylon 66 is added. The polyurethane resin composition of the resultant blend solution is 23.33 parts by weight of nylon 6 or nylon 66 per 100 parts by weight of polyurethane resin. The resultant skin of the leather-like fabric exhibits properties as indicated in Table II.

TABLE II

| Example No. | Nylon 6 or Nylon 66 (parts by weight) | PU (parts by weight) | Physical strength | Color fastness (in grade) |
| --- | --- | --- | --- | --- |
| 4 | 13.33 | 100 | good | 3-4 |
| 5 | 8.33 | 100 | bad* | |
| 6 | 33.33 | 100 | poor*** | |

Remark:
***denotes the resultant skin has white spots

EXAMPLE 7

Take 6 cc of the polyester resin solution of 6% by weight of polyethylene terephthalate resin and 8 cc of polyamide resin solution of 8% by weight of nylon 6 or nylon 66 to mix with 60 cc of polyurethane resin solution of 10% by weight of one component PU resin to obtain a blend solution. The polyurethane resin composition of the resultant blend solution is 16.66% by weight of carbonyl-group containing polymer resin i.e. 10.66% by weight of nylon 6 or nylon 66 resin plus 6% by weight of polyethylene terephthalate resin, prer 100 parts by weight of polyyurethane resin. The blend solution is coated on top of a release paper, then oven-dried at 80° C. for 1.5 minutes and pressed against a fabric which is already coated with a two-component PU resin as adhesive. The fabric is then oven-cured and separated from the release paper. This leather-like coated fabric is heat-transfer printed at 200° C. for 20 seconds with a transfer print paper (with disperse dye). The printed leather is found to be colorful, to be of good physical strength and to possess a 3-4 grade of color fastness which are listed in Table III.

EXAMPLE 8

The procedure of example 5 is followed except 5 cc of the polyester resin solution of 4% by weight of polyethylene terephthalate resin and 5 cc of the polyamide resin solution of 4% by weight of nylon 6 or nylon 66 resin are added. The polyurethane resin composition of the resultant blend solution is 6.66 parts by weight of the carbonyl-group containing polymer resin, i.e. 3.33 parts by weight of nylon 6 or nylon 66 resin plus 3.33 parts by weight of polyethylene terephthalate resin, per 100 parts by weight of polyurethane resin. The resultant skin of the leather-like fabric exhibits properties as indicated in Table III.

EXAMPLE 9

The procedure of example 5 is followed except 10 cc of the polyester resin solution of 10% by weight of polyethylene terephthalate resin and 10 cc of the polyamide resin solution of 10% by weight of nylon 6 or nylon 66 resin are added. The polyurethane resin composition of the resultant blend solution is 33.33 parts by weight of carbonyl-group containing polymer resin, i.e. 16.66 parts by weight of nylon 6 or nylon 66 resin plus 16.66 parts by weight of polyethylene terephthalate resin, per 100 parts by weight of polyurethane resin. The resultant skin of the leather-like fabric exhibits properties as indicated in Table III.

TABLE III

| Example No. | Parts by weight Nylon 6 or Nylon 66 | PET | PU | Physical strength | color fastness (in grade) |
| --- | --- | --- | --- | --- | --- |
| 7 | 10.66 | 6 | 100 | good | 3-4 |
| 8 | 3.33 | 3.33 | 100 | bad* | |
| 9 | 16.66 | 16.66 | 100 | poor*** | |

What I claim is:

1. A polyurethane resin composition capable of heat transfer printing comprising:
   (a) one polyurethane resin; and
   (b) nylon 6 resin in an amount of 10 to 30 parts by weight per 100 parts by weight of said polyurethane resin.

2. A process for manufacturing a polyurethane resin composition capable of heat transfer printing comprising the steps of:
   (a) preparing a solution blend of the polyurethane resin composition by mixing a polyurethane solution and nylon 6 resin solution, the nylon 6 resin solution being in an amount between 10 to 30 parts by weight per 100 parts by weight of the polyurethane solution; and
   (b) drying the solution mixed according to step (a) to eliminate solvents from the polyurethane resin composition.

3. A process as in claim 2 wherein step (b) is practiced by dissolving a nylon 6 resin in a solvent selected from the group consisting of formic acid, acetic acid, m-cresol, chlorophenol, trichloroacetic acid, ethylene carbonte, sulfuric acid, phosphoric acid, hexamethylphosphoric acid, dimethyl sulfoxide, trifluoroethanol, chloral hydrate, halogenated acetic acid, hydrogen fluoride, hydrogen chloride/methanol, liquid sulfur dioxide, methanol solution of calcium chloride, methanol solution of magnesium chloride, benzyl alcohol, ethylene chlorohydrin, 1,3-chloro-propanol, 2-butene-1,4,-ethylene glycol, diethylene glycol, N-acetyl morpholin, formamide, chloroform, and trifluoroacetic acid.

4. A process as in claim 2 or 3 in which step (a) is practiced by dissolving the polyurethane resin in a solvent selected from the group consisting of dimethyl formamide, benzene and toluene.

5. A process as in claim 2 or 3 in which the viscosity of the solution blend is controlled in a range from 5000 to 12000 cps.

* * * * *